(12) United States Patent
Ferenczi et al.

(10) Patent No.: US 8,904,553 B2
(45) Date of Patent: Dec. 2, 2014

(54) RESOURCE EXPRESSION FOR ACCESS CONTROL

(75) Inventors: Marc Ferenczi, Paris (FR); Christian Ah-Soon, Franconville (FR); Fabien Kobus, Le Mans (FR)

(73) Assignee: Business Objects Software Limited, Dublin (IE)

( * ) Notice: Subject to any disclaimer, the term of this patent is extended or adjusted under 35 U.S.C. 154(b) by 376 days.

(21) Appl. No.: 13/047,809

(22) Filed: Mar. 15, 2011

(65) Prior Publication Data

US 2012/0240242 A1 Sep. 20, 2012

(51) Int. Cl.
*H04L 29/06* (2006.01)
*G06F 21/60* (2013.01)
*G06F 21/62* (2013.01)

(52) U.S. Cl.
CPC .............. *G06F 21/604* (2013.01); *G06F 21/62* (2013.01); *G06F 21/6218* (2013.01)
USPC .......................................................... 726/28

(58) Field of Classification Search
None
See application file for complete search history.

(56) References Cited

U.S. PATENT DOCUMENTS

| | | | |
|---|---|---|---|
| 2003/0200467 A1* | 10/2003 | Choy et al. ..................... | 713/202 |
| 2004/0162894 A1* | 8/2004 | Griffin et al. ................. | 709/223 |
| 2005/0262572 A1* | 11/2005 | Yoneyama ....................... | 726/27 |
| 2006/0136990 A1* | 6/2006 | Hinton et al. .................... | 726/2 |
| 2010/0088341 A1 | 4/2010 | Ah-Soon | |

OTHER PUBLICATIONS

Denning, Dorothy E.; A lattice model of secure information flow; Communications of the ACM, vol. 19 Issue 5, pp. 236-243, doi:10.1145/360051.360056; ACM New York, NY, USA; May 1976 (http://dl.acm.org/citation.cfm?id=360056).

Sandhu, Ravi S.; Lattice-based access control models; IEEE Computer, vol. 26, Issue 11, pp. 9-19, doi:10.1109/2.241422; IEEE Computer Society, Washington, DC, USA; Nov. 1993. (http://doi.ieeecomputersociety.org/10.1109/2.241422).

Wei-Chang Yeh; An improved sum-of-disjoint-products technique for the symbolic network reliability analysis with known minimal paths; Proceedings of ICITA 2005 (International Conference on Information Technology and Applications); Sydney, Australia, Jul. 4-7, 2005; IEEE Computer Society, Washington, DC, USA; 2005. (http://ieeexplore.ieee.org/xpl/freeabs_all.jsp?arnumber=1489056).

* cited by examiner

*Primary Examiner* — David Le (57) ABSTRACT

Various embodiments of systems and methods for providing an expression of a resource for access control are described herein. One or more business security profiles associated with a user are received. The business security profile is defined including a resource expression. The resource expression can include a resource expression with a quantifier or the resource expression without a quantifier. Further, a net profile of the user is computed using symbolic calculus on the resource expression of the one or more business security profiles. The net profile of the user includes a set of granted resources and a set of denied resources. Based upon the computed net profile, access to a resource is authorized for the user.

30 Claims, 5 Drawing Sheets

FIG. 1

| DEFINE BUSINESS SECURITY PROFILE | _ ☐ ✕ |
|---|---|
| BUSINESS SECURITY PROFILE NAME: SALES PROFILE 220 | |

| CREATE QUERY | DISPLAY DATA |
|---|---|

UNIVERSE VIEWS 205 | STATUS
--- | ---
ALL UNIVERSE VIEWS | ✕ DENIED
SALES VIEW | ✓ GRANTED
ADVANCED SALES VIEW | ✓ GRANTED

UNIVERSE OBJECTS 210 | STATUS
--- | ---
ALL OBJECTS | ✓ GRANTED
@VARIABLES | ✕ DENIED
@CLASS | ✕ DENIED
US CUSTOMERS | ✕ DENIED

| INSERT GRANTED 225 | INSERT DENIED 230 | DELETE 235 | | OK | CANCEL |

RESOURCE EXPRESSION FOR ACCESS CONTROL

FIELD

Embodiments generally relate to computer systems and more particularly to methods and systems for providing a resource expression for access control.

BACKGROUND

Access control enables an authority to control access to resources in a computer based system. Access control deals with resources on one side and users on the other side. It enables an administrator or the authority to prevent unauthorized users from accessing resources. However, one of the main challenges faced in the access control system is the complexity of the overall system. In other words, a single computer storing millions of files, with thousands of connected users able to access the resources distributed across a network, and with operations allowed on given resource such as right to view, to modify, to delete, and the like, increases the complexity of the access control system.

In a typical access control system, the resources are placed in the foreground. Each resource is equipped with an access control list that holds a user or user groups with some permission (i.e., whether the resource is granted or denied) for a particular resource. Therefore, setting the security rights on the resource side makes it impossible to grant or deny access to all resources. It would require a change to the access control list of each existing resource, which is not feasible.

Currently, users are placed in the foreground. The concept of role is introduced and specified by the role based access control model. The role is a profile restricted to granted permissions and the role cannot contain denied permissions. Therefore, the role that grants every resource becomes available. However, once a universal role (i.e., permission to all resources) is assigned to the user, it becomes difficult to forbid the user from the permission of some resources.

In general, administration of current access control systems remains cumbersome and time consuming. Also, analyzing which resources are authorized and denied to the user is difficult. Moreover, no method or system provides the complete view of the net rights of the user.

SUMMARY

Various embodiments of systems and methods for providing an expression of a resource for access control are described herein. In one aspect, one or more business security profiles associated with a user are received. The business security profile is defined including a resource expression. The resource expression can include a resource expression with a quantifier or a resource expression without a quantifier. Further, a net profile of the user is computed using symbolic calculus on the resource expression of the one or more business security profiles. The net profile of the user includes a set of granted resources and a set of denied resources. Based upon the computed net profile, access to a resource is authorized for the user.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for providing an expression of a resource for access control are described herein. A resource or system resource can be a physical or a virtual component having an identity in an enterprise or organization. For example, the resource includes an electronic document, an image, a service, a file, a network connection, a memory, and the like. In one embodiment, an expression of the resource provides access status of the resources for a user. The user refers to an agent, a human, a computer, other mechanism or actors capable of accessing the resource. The resource expression can include a resource expression with a quantifier or a resource expression without a quantifier.

According to an embodiment, one or more business security profiles associated with a user are received. The business security profile is defined including a resource expression. Further, a net profile of the user is computed to authorize access to a resource for the user. In this way, an administrator or authority of the organization can define a business security profile including a set of granted resources, a set of denied resources and a set of undefined resources. Further, the net resource for which access is granted and denied to the user is determined and accordingly the access to the resources is authorized for the user.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
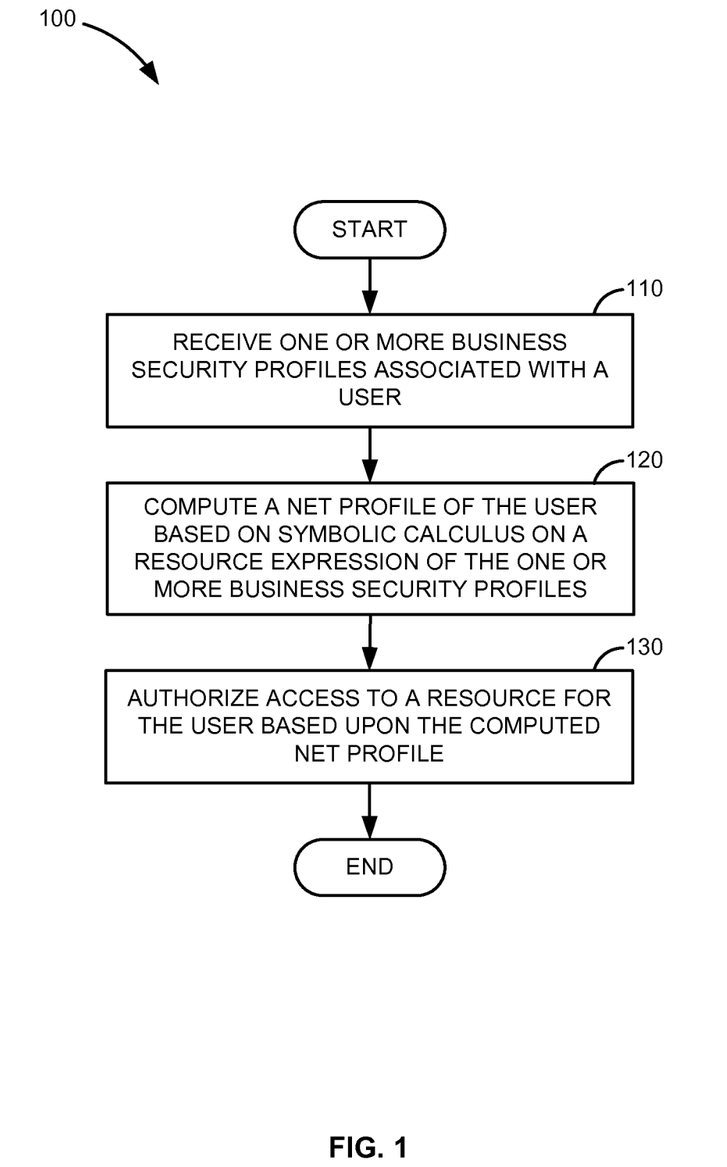
FIG. 1 is a flow diagram illustrating a method of providing a resource expression for access control, according to an embodiment.

FIG. 1 is a flow diagram 100 illustrating a method of providing a resource expression for access control, according to an embodiment. At step 110, one or more business security profiles associated with a user are received. In one embodiment, the business security profile is defined including the resource expression. In other words, the business security profile includes a consistent set of permissions using the resource expression. The resource expression defines access status of the resource in terms of quantifiers. The quantifier defines the resource expression, such as whether the access for the resource is granted or denied or undefined.

In one embodiment, the resource expression includes a resource expression with a quantifier or a resource expression without a quantifier. The resource expression with the quantifier consists of access to all granted resources except a set of denied resources or consists of all denied resources except access to a set of granted resources. The resource expression without the quantifier includes at least one of a set of granted resources, a set of denied resources, and a set of undefined resources. In other words, the resource expression without the quantifier consists of the set of granted resources and the set of denied resources, wherein both the sets are disjoint sets.

In one embodiment, an organization may define a plurality of business security profiles for different categories. For example, a sales profile to include the resource expression for sales related resources, a marketing profile to include the resource expression for marketing related resources, and the like. Further, the defined business security profile is assigned to the user or a user group. Defining the business security profile and assigning the business security profile to the user or the user group are described in greater detail in FIGS. 2 and 3 respectively.

At step 120, a net profile of the user is computed using symbolic calculus on the resource expression of the received one or more business security profiles. In one exemplary embodiment, the user may be associated with a plurality of the business security profiles. Therefore, a net profile of the user is computed to determine a net resource for which the user is authorized to access. For example, if a user is associated with two business security profiles, such as a sales profile and a marketing profile, a net profile is computed to get a composite set of resources for which access is granted and a composite set of resources for which the access is denied in association with both the sales profile and the marketing profile.

In one embodiment, computing the net profile of each user includes aggregating at least one of a maximum value (Max) and a minimum value (Min) of the business security profiles of the user. For example, when the user belongs to a user group H which is a subgroup of a user group G, then the minimum value of the associated H and G profiles is taken as the net profile of the user. When the user belongs to two independent groups G and I, the maximum value of the associated G and I profiles is taken as the net profile of the user. Therefore, the net profile of a user is obtained by an equation (1) as shown below.

$$\text{Net profile of a user} = \text{Max}(\text{Min}(P_i, P_j)) \quad (1)$$

Wherein, Pi and Pj are the profiles assigned to the user's groups in which the user is a member. The truth tables defining the maximum and minimum operators are depicted in Tables 1 and 2 respectively.

TABLE 1

| Maximum(Pi, Pj) | | Pj | | |
|---|---|---|---|---|
| | | Granted | Denied | Undefined |
| Pi | Granted | Granted | Granted | Granted |
| | Denied | Granted | Denied | Denied |
| | Undefined | Granted | Denied | Undefined |

TABLE 2

| Minimum(Pi, Pj) | | Pj | | |
|---|---|---|---|---|
| | | Granted | Denied | Undefined |
| Pi | Granted | Granted | Denied | Granted |
| | Denied | Denied | Denied | Denied |
| | Undefined | Granted | Denied | Undefined |

Tables 1 and 2 depict the nature of the maximum operator and minimum operator respectively. The maximum operator behaves as a logical OR operation (as depicted in Table 1), wherein the maximum operator grants access to the resource if the resource is granted in at least one associated business security profile. For example, considering two business security profiles (e.g., Pi and Pj), if the resource is granted in Pi or in Pj, the access for the resource is granted for the user. Further, if the resource is denied in any of the business security profiles (Pi or Pj), the resource is denied for accessing for the user. Furthermore, if the resource is undefined in Pi and granted in Pj, the access for the resource is granted. Similarly, if the resource is denied in Pi and undefined in Pj, the resource is denied for accessing for the user. Also, if the resource is undefined in Pi and Pj, the resource remains undefined.

The minimum operator behaves as a logical AND operation (as depicted in Table 2), wherein the minimum operator grants access to the resource if the resource is granted in all the associated business security profiles. For example, considering two business security profiles (e.g., Pi and Pj), if the resource is granted in Pi and denied in Pj, the resource is denied for accessing for the user. Similarly, if the resource is denied in Pj and granted in Pj, the resource is denied for accessing for the user. Further, if the resource is granted in both the business security profiles (e.g., Pi and Pj), the access for the resource is granted for the user. Furthermore, if the resource is undefined in Pi and granted in Pj, the access for the resource is granted. Similarly, if the resource is denied in Pi and undefined in Pj, the resource is denied for accessing for the user. Also, if the resource is undefined in Pi and Pj, the resource remains undefined.

In one embodiment, the symbolic calculus includes operations on at least one of a set of granted resources, a set of denied resources and a set of undefined resources using a set operator selected from a group consisting of union (U), intersection (∩), and except (or difference, "-") operators. The net profile of each user includes a set of granted resources and a set of denied resources for each user, and no undefined resources. For example, two profiles P1 and P2, wherein profile P1 includes a set of granted resources (G1) and a set of denied resources (D2), denoted by G1/D2. The slash operator (/) is a placeholder used to distinguish the granted set of resources (G1) from the denied set of resources (D2). Therefore, profile P1 is represented by P1=G1/D1, wherein the profile P1 includes the grated set of resources (G1) and the denied set of resources (D1). Profile P2 includes a set of granted resources (G2) and a set of denied resources (D2), denoted by G2/D2.

In one exemplary embodiment, if there were no undefined resources, the corresponding equations would be:

$$Min(P1,P2)=(G1 \cap G2)/(D1 \cup D2) \quad (2)$$

$$Max(P1,P2)=(G1 \cup G2)/(D1 \cap D2) \quad (3)$$

Where,
∩ represents an intersection set operation,
∪ represents a union set operation, and
/ is a separator between granted and denied resources.
For example, consider four resources R1, R2, R3 and R4. Profile P1 includes all granted resources (R1, R2, and R3) except resource R4, and for profile P2 includes all granted resources (R1, R3, and R4) except resource R2.
Then, using equation (2), $$Min(P1,P2)=(\{R1,R2,R3\} \cap \{R1,R3,R4\})/(\{R4\} \cup \{R2\})$$

Therefore, net profile includes resources R1 and R3 as granted resources, and R2 and R4 as denied resources.
Using equation (3)

$$Max(P1,P2)=(\{R1,R2,R3\} \cup \{R1,R3,R4\})/(\{R4\} \cap \{R2\})$$

$$Max(P1,P2)=(\{R1,R2,R3,R4\})/\emptyset$$

$$Max(P1,P2)=\{R1,R2,R3,R4\}$$

Wherein, ∅ indicates an empty set. Therefore, net profile includes all resources as granted resources and none of the resources as denied resources.

In another exemplary embodiment, with possible undefined values, the equations (2) and (3) are refined to generate equations (4) and (5) as given below.

$$Min(P1,P2)=(G1-D2) \cup (G2-D1)/(D1 \cup D2) \quad (4)$$

The result of the set difference operator (−) is the members of the first set that are not the members of the second set. In other words, a resource is granted if the resource is granted in one profile, and not denied in another profile. And, the resource is denied if the resource is denied in at least in one profile.

$$Max(P1,P2)=(G1 \cup G2)/(D1-G2) \cup (D2-G1) \quad (5)$$

In other words, a resource is denied if the resource is denied in one profile but not granted in other profile. And, the resource is granted, if the resource is granted in at least in one profile.
For example, profile P1 includes granted resources R1 and R2 and denied resources R3 and R4. Profile P2 includes granted resources R1, R3 and R5, and denied resources R2, R4 and R6.
Then, using equation (4), $$Min(P1,P2)=[(\{R1,R2\}-\{R2,R4,R6\}) \cup (\{R1,R3,R5\}-\{R3,R4\})]/(\{R3,R4\} \cup \{R2,R4,R6\})$$

$$Min(P1,P2)=(\{R1,R5\})/(\{R2,R3,R4,R6\})$$

Therefore, resources R1 and R5 are granted, and resources R2, R3, R4 and R6 are denied. Using equation (5)

$$Max(P1,P2)=(\{R1,R2\} \cup \{R1,R3,R5\})/[(\{R3,R4\}-\{R1,R3,R5\}) \cup (\{R2,R4,R6\}-\{R1,R2\})]$$

$$Max(P1,P2)=(\{R1,R2,R3,R5\})/(\{R4,R6\})$$

Therefore, resources R1, R2, R3 and R5 are granted, and resources R4 and R6 are denied.

In another exemplary embodiment, an expression (G/D) with a quantified expression (All Granted/D) is considered. The quantifier 'All Granted' is replaced by the set U of all existing resources at computation time, denoted as given below $$\text{All Granted}/D = U-D/D$$

(U−D) denotes all resources expect the denied resources. Now, considering profile P1 including (G1/D1) and profile P2 including (All Granted/D2), and using equation (4), Min (P1, P2) can be computed as Min (P1, P2)=(G1−D2)∪(U−D2)−D1/D1∪D2. Then, for the granted set (U−D2)−D1=U−(D1∪D2). Further, (G1−D2) is a subset of U−(D1∪D2) because G1 and D1 are disjoint. So G1−D2 has no common element with both D1 and D2. Thus, (G1−D2)∪((U−D2)−D1)=U−(D1∪D2).
Therefore, $$Min(P1,P2)=(U-D2)-D1/(D1 \cup D2)=U-(D1 \cup D2)/(D1 \cup D2)$$

$$Min(P1,P2)=\text{All Granted}/(D1 \cup D2)$$

Further, Max (P1, P2) can be computed using equation (5) as given below Max (P1, P2)=G1∪(U−D2)/(D1−(U−D2)) ∪ (D2−G1). Then, G1∪(U−D2)=U−(D2−G1). Further, (D1−(U−D2))=U−(D1∩D2) which is a subset of (D2−G1). Hence, (D1−(U−D2))∪(D2−G1)=D2−G1.
Therefore, $$Max(P1,P2)=U-(D2-G1)/(D2-G1)$$

$$Max(P1,P2)=\text{All Granted}/(D2-G1)$$

These give two new equations for quantified expression (All Granted/D2) as follows:

$$Min(P1,P2)=\text{All Granted}/(D1 \cup D2) \quad (6)$$

$$Max(P1,P2)=\text{All Granted}/(D2-G1) \quad (7)$$

For example, profile P1 includes granted resources R1 and R2 and denied resources R3 and R4. In the same example, profile P2 includes all granted resources except resources R2, R4 and R5 are denied.
Then, using equation (6), $$Min(P1,P2)=\text{All Granted}/(\{R3,R4\} \cup \{R2,R4,R5\})$$

$$Min(P1,P2)=\text{All Granted}/(\{R2,R3,R4,R5\})$$

Therefore, net profile includes resources R1 as granted resource and R2, R3, R4 and R5 as denied resources.
Using equation (7)

$$Max(P1,P2)=\text{All Granted}/(\{R2,R4,R5\}-\{R1,R2\})$$

$$Max(P1,P2)=\text{All Granted}/(\{R4,R5\})$$

Therefore, net profile includes R1 and R2 as granted resources, and R4 and R5 as denied resources.
Similarly, the net profile for an expression with a quantified expression (All Denied/G2) is computed which leads to two more equations (8) and (9) as given below:

$$Min(P1,P2)=\text{All Denied}/(G2-D1) \quad (8)$$

$$Max(P1,P2)=\text{All Denied}/(G1 \cup G2) \quad (9)$$

Wherein, profile P1 includes (G1/D1) and P2 includes (All Denied/G2).

In yet another exemplary embodiment, for all the quantified expressions with no undefined resources, the equations used to compute net profile are given in equations (10) to (15) as shown below:

$$Min(P1,P2) = \text{All Granted}/(D1 \cup D2) \quad (10)$$

$$Max(P1,P2) = \text{All Granted}/(D1 \cap D2) \quad (11)$$

Wherein, profile P1 includes (All Granted/D1) and profile P2 includes (All Granted/D2)

$$Min(P1,P2) = \text{All Denied}/(G2-D1) \quad (12)$$

$$Max(P1,P2) = \text{All Granted}/(D1-G2) \quad (13)$$

Wherein, profile P1 includes (All Granted/D1) and profile P2 includes (All Denied/G2).

$$Min(P1,P2) = \text{All Denied}/(G1 \cap G2) \quad (14)$$

$$Max(P1,P2) = \text{All Denied}/(G1 \cup G2) \quad (15)$$

Wherein, profile P1 includes (All Denied/G1) and profile P2 includes (All Denied/G2).

In summary, using the equations as described above, the net profile of each user can be computed. For example, consider three profiles P1, P2 and P3, where P1 includes all granted resources, P2 includes all granted resources except R1 and R2, and P3 includes all denied resources except R1. The net profile can be computed as Max((Min(P1, P2)), P3). Using equation (2), $$Min(P1,P2) = (\text{All Granted} \cap \text{All Granted})/(R1 \cup R2)$$

$$Min(P1,P2) = Pa = \text{All Granted}/\{R1,R2\}$$

Further, using equation (13)

$$Max(Pa,P3) = \text{All Granted}/(\{R1,R2\}-\{R1\})$$

$$Max(Pa,P3) = \text{All Granted}/\{R2\}$$

Therefore, the net profile includes all granted resources except resource R2.

At step 130, access to a resource is authorized to a user based upon the computed net profile. In summary, the introduction of quantifiers for resource expression eliminates any undefined value and gives a list of resources the user is authorized to access. The above derived equations with quantifiers are simpler and therefore the complexity of the access control system is minimized. Further, the above derived equations include set algebra, which is simpler when compared to conventional Boolean binary operations. For example, considering two profiles P1 and P2, wherein P1 includes all granted resources except a resource R3 and P2 includes all granted resources except a resource R4. Using Boolean binary operation, All Granted except R3 gives R1 granted, R2 granted, R3 denied, R4 granted, R5 granted, and so on. All Granted except R4 gives R1 granted, R2 granted, R3 granted, R4 denied, R5 granted, and so on. Further, using binary operation AND, access for each of the resources are computed, which can include millions of resources (e.g., R1 granted AND R1 granted=R1 granted; R2 granted AND R2 granted=R1 granted; R10 denied AND R3 granted=R3 denied; and so on). On the other hand, by using set algebra, the result of All Granted except R10 and R11 is obtained by computing the union of sets except {R3} and {R4, which results All Granted except R3 and R4. Therefore, Boolean binary operation uses a full list of existing resources that would render the computation of rights unfeasible.

Figure 2:
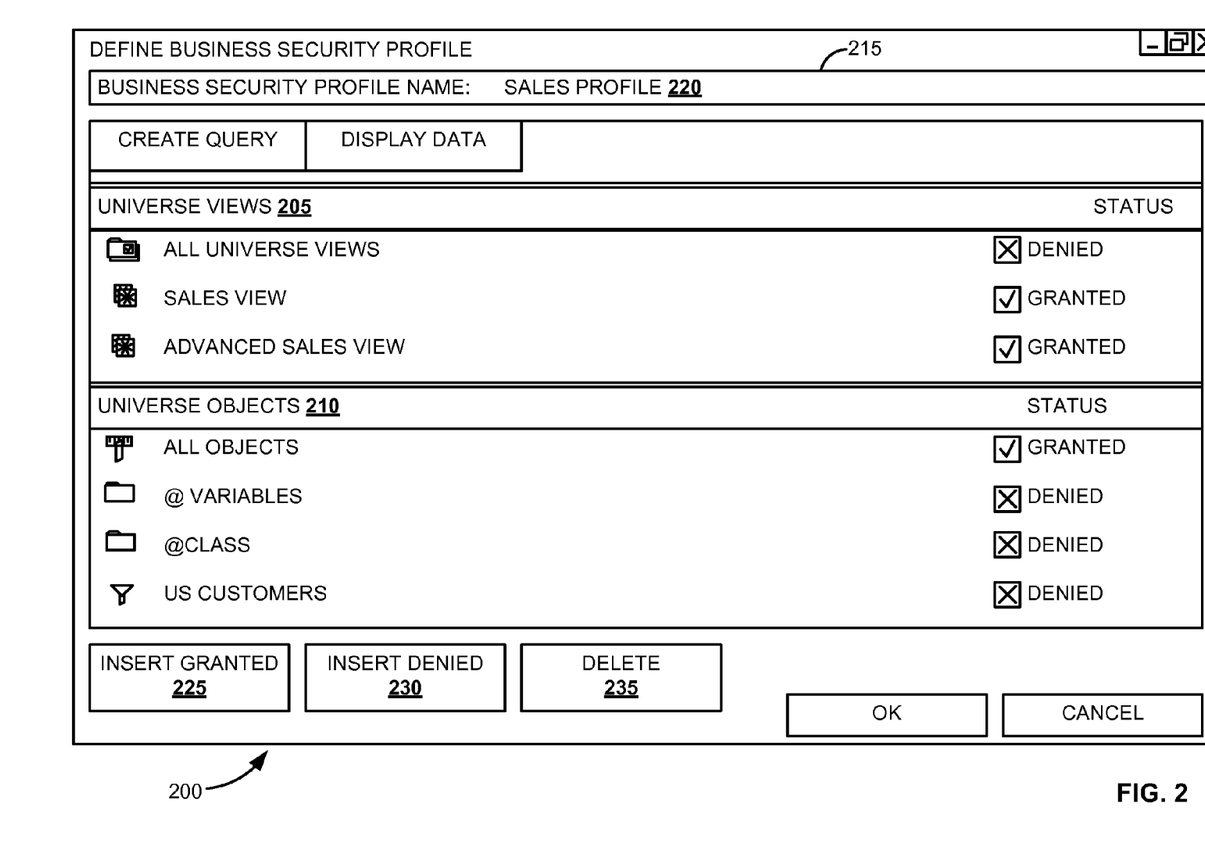
FIG. 2 is an exemplary Graphical User Interface (GUI) for defining a business security profile, according to an embodiment.

FIG. 2 is an exemplary Graphical User Interface (GUI) 200 for defining a business security profile, according to an embodiment. In one exemplary embodiment, a universe is considered as a resource. A universe is a file consisting of connection parameters for one or more database middleware and Structured Query Language (SQL) structures called objects that map to actual SQL structures in the database such as columns, tables, and database functions. Objects are grouped into classes. A class is a logical grouping of objects within the universe. The class represents a category of objects. The class can be divided hierarchically into sub-classes. The object is a named component that maps to data or a derivation of data in the database. In another exemplary embodiment, the method can be applied to other query languages such as Multidimensional Expressions (MDX) query language and the like. In one embodiment, the universe can include different views, like different categories of objects. For example, the universe can include objects of human resources, objects for health, objects for research and development, and the like.

In one exemplary embodiment, universe views 205 and universe objects 210 are considered as the resources. Further, an option is provided for an administrator to create a business security profile name as in 215. For example, a sales profile 220 is created. The sales profile 220 includes resource expression for resources universe views 205 and universe objects 210. For example, 'all universe views' are denied except for 'sales view' and 'advanced sales view' in the universe views 205. Further, 'all objects' are granted except for 'variable', 'class' and 'US customers' in the universe objects 210. In general, for the universe, different security profiles can be created by defining a set of granted resources and a set of denied resources. Further, an option is provided for the administrator to grant the resource (e.g., 'insert granted' 225), deny the resource (e.g., 'insert denied' 230), and delete the resource (e.g., 'delete' 235).

In one exemplary embodiment, the administrator can grant all resources or grant all resources except a set of resources or deny all resources or deny all resources except a set of resources for accessing the resources for the business security profile. However, if a resource is not granted nor denied, the particular resource remains undefined. In one exemplary embodiment, the quantifiers of the resource expression give a status to future resources as well. In other words, an all-granted quantifier grants access to any resource that will be created or installed in future and the all-denied quantifier does the converse. In one embodiment, the defined business security profile is assigned to one or more users. In one embodiment, the one or more users can include at least one of a user, a user group, and all users in the organization. Assigning the business security profile to the one or more users is described in greater detail in FIG. 3.

Figure 3:
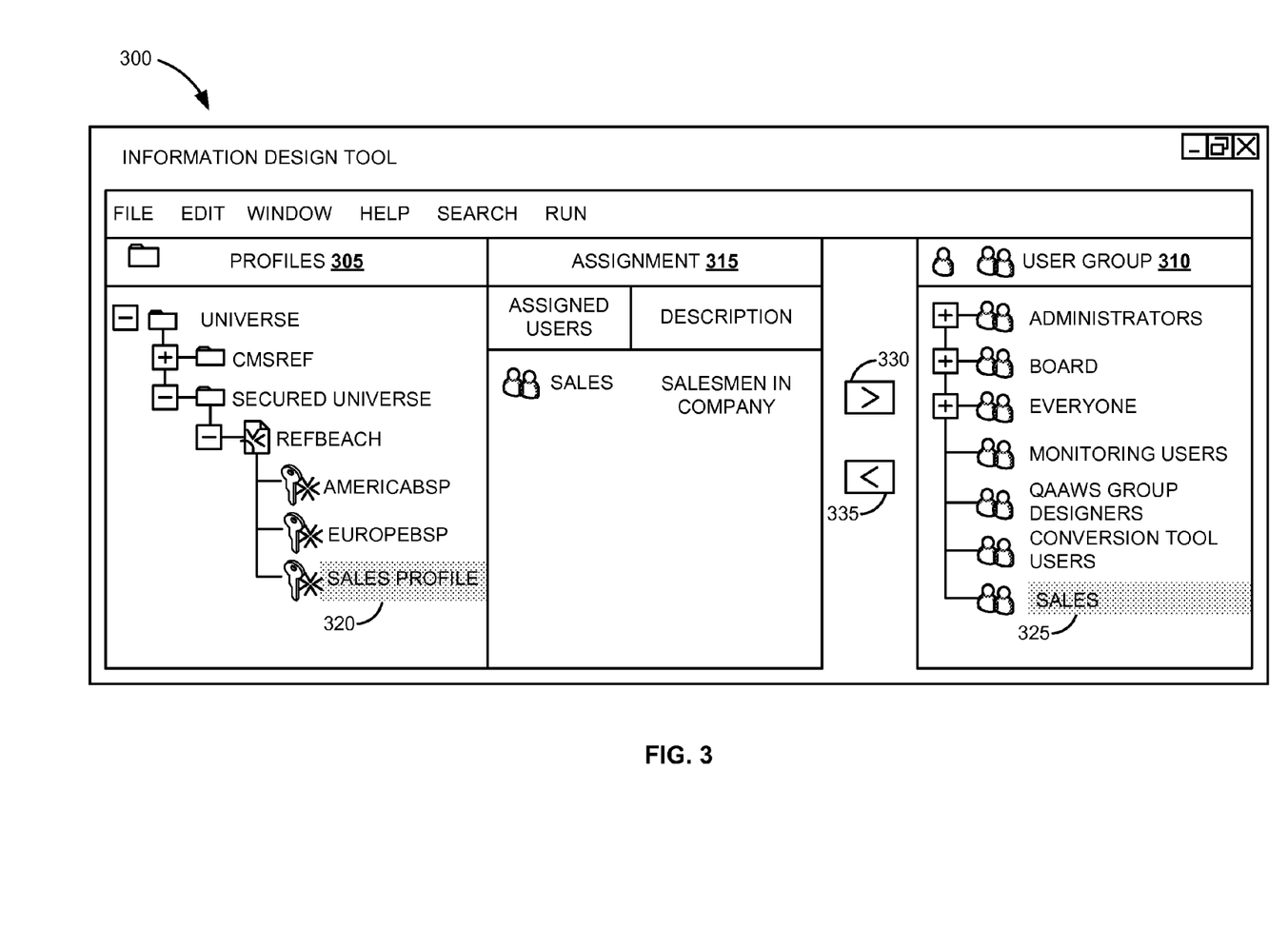
FIG. 3 is an exemplary GUI for assigning a business security profile to one or more users, according to an embodiment.

FIG. 3 is a schematic diagram of an exemplary Graphical User Interface (GUI) 300 for assigning a business security profile to one or more users, according to an embodiment. The exemplary GUI 300 includes a profile display region 305 to display a plurality of defined profiles, and a user or user group display region 310 to display users or user groups. In one exemplary embodiment, the defined sales profile as displayed in the profile display region 305 is assigned to a user or user group as displayed in the user display region 310 in an assignment region 315 using add 330 and remove 335 options.

For example, a sales profile 320 in the profile display region 305 is assigned to sales user group 325 as in 315. Further, the description of the user is displayed in 315. In general, specific business security profile can be assigned to different users. For each profile, different securities can be defined with an introduction of quantifiers. Further, a net profile of a user is computed as described above to determine the list of resources that the user is authorized to access. In one embodiment, the usage of above described equations applies to resources and as well as folders of resources. For example, considering the objects of a given universe (which are organized in classes and subclasses as files are organized in folders and subfolders), the following inheritance rules are applicable as obtained from the above described equations: if a class is denied, then all the objects and subclasses below are denied; and if a class is granted, then the objects and subclasses that are not denied are granted.

Figure 4:
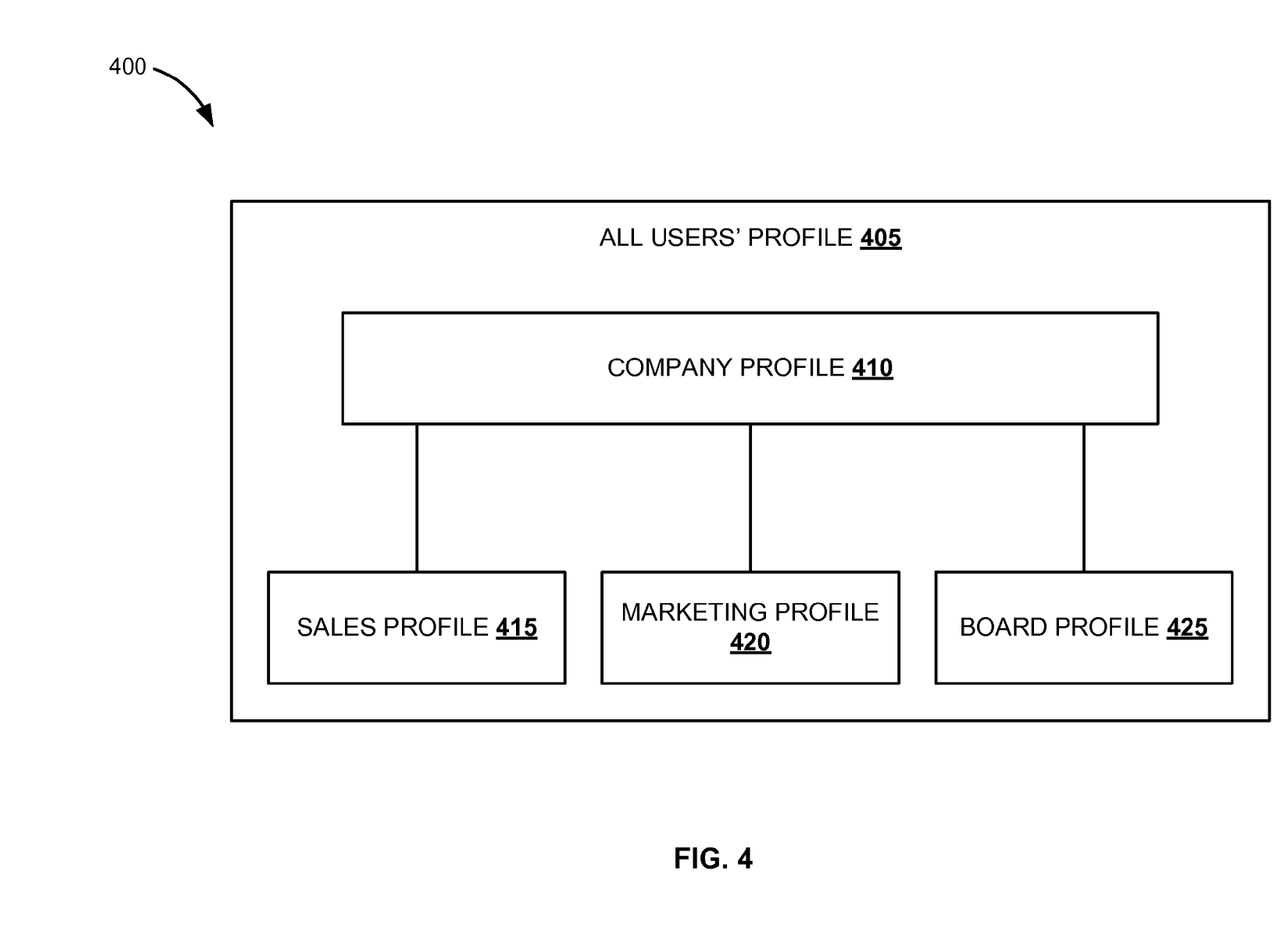
FIG. 4 is an exemplary block diagram illustrating a resource expression for access control, according to an embodiment.

FIG. 4 is an exemplary block diagram 400 illustrating a resource expression for access control, according to an embodiment. In one exemplary embodiment, five business security profiles for an organization are defined. The five business security profiles include all users' profile (Pa) 405, company profile (Pc) 410, sales profile (Ps) 415, marketing profile (Pm) 420, and board profile (Pb) 425. All resources are denied for the all users' profile (Pa) 405. Company view is granted for the company profile (Pc) 410. All resources are granted except marketing view for the sales profile (Ps) 415. Further, all resources are granted for the board profile (Pb) 425. All resources are granted except sales view for the marketing profile (Pm).

Further, the defined business security profiles are assigned to associated user groups. For example, the all users' profile 405 is assigned to a user group V. Similarly, the Company profile 410, the Sales profile 415, the Marketing profile 420, and the Board profile 425 are assigned to user groups C, S, M, and B respectively.

Furthermore, a net profile of each user is computed using symbolic calculus on a resource expression of the assigned business security profile. For example, the net profile of a user in the user group V is Pa (i.e., all resources denied). The net profile of a user in the user group C is Max(Pa, Pc) (i.e., all resources denied except company view). The net profile of a user in the user group S is Max(Pa, Min(Pc, Ps)) (i.e., all resources granted except marketing view). The net profile of a user in the user group M is Max(Pa, Min(Pc, Ps)) (i.e., all resources granted except sales view). And, the net profile of a user in the user group B is Max(Pa, Min(Pc, Pb)) (i.e., all resources granted). In summary, an administrator can define to set both positive (i.e., grant) or negative (i.e., deny) security to the resources, and combine the two securities and the undefined securities to compute what a user is authorized for accessing the resources. Accordingly, the user is authorized to access the resources.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
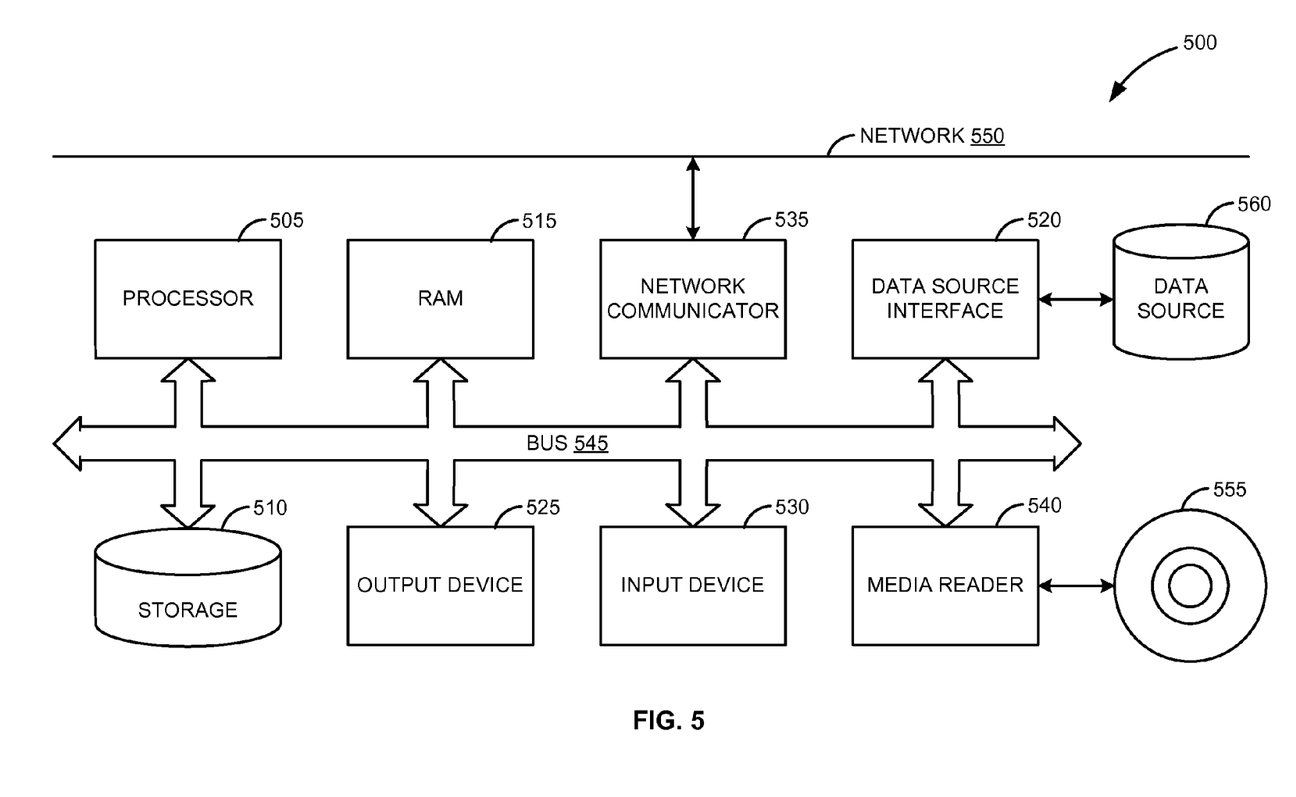
FIG. 5 is a block diagram illustrating a computing environment in which the techniques described for providing a resource expression for access control, according to an embodiment.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval.

Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable storage medium storing instructions thereon, which when executed by a computer, cause the computer to:
    receive one or more business security profiles that include resource expressions, wherein a resource expression from the resource expressions provides a permission status of a right for resources, the resource expressions include at least one of a set of resources for which the permission status of the right is granted, a set of resources for which the permission status of the right is denied, and a set of resources for which the permission status of the right is undefined;
    calculate at least one of a maximum value and a minimum value of the one or more business security profiles, wherein:
        the maximum value grants the right for a resource when the right is granted for the resource in at least one business security profile from the one or more business security profiles, and the minimum value grants the right for the resource when the right is granted for the resource in one business security profile from the one or more business security profiles and is not denied in another business security profile from the one or more business security profiles, and
        the at least one of the maximum value and the minimum value is calculated by using set algebra on the resource expressions, the set algebra includes set operations on at least one of the set of resources for which the permission status of the right is granted, the set of resources for which the permission status of the right is denied, and the set of resources for which the permission status of the right is undefined;
    compute a net profile to determine net resources from the set of resources for which the permission status of the right is granted, the set of resources for which the permission status of the right is denied, and the set of resources for which the permission status of the right is undefined, wherein the net profile is computed by aggregating the at least one of the maximum value and the minimum value of the one or more business security profiles; and
    based on the computed net profile, provide the permission status of the right for the net resources, the permission status is one of granted or denied.

2. The non-transitory computer readable storage medium of claim 1, wherein the resource expressions include a resource expression with a quantifier.

3. The non-transitory computer readable storage medium of claim 2, wherein the resource expression with the quantifier provides that the right is granted for all resources.

4. The non-transitory computer readable storage medium of claim 2, wherein the resource expression with the quantifier provides that the right is granted for all resources except for one or more resources.

5. The non-transitory computer readable storage medium of claim 2, wherein the resource expression with the quantifier provides that the right is denied for all resources.

6. The non-transitory computer readable storage medium of claim 2, wherein the resource expression with the quantifier provides that the right is denied for all resources except for one or more resources.

7. The non-transitory computer readable storage medium of claim 1, wherein the set algebra comprises a set operator selected from a group consisting of union, intersection, and set-theoretic difference.

8. The non-transitory computer readable storage medium of claim 1, further comprising:
    for the set of resources for which the permission status of the right is undefined, changing the undefined permission status to the one of granted or denied by the computing of the net profile.

9. The non-transitory computer readable storage medium of claim 1, wherein the maximum value denies access to the resource when the resource is denied in one business security profile from the one or more business security profiles and is not granted in another business security profile from the one or more business security profiles.

10. The non-transitory computer readable storage medium of claim 1, wherein the minimum value denies access to the resource when the resource is denied in at least one business security profile from the one or more business security profiles.

11. A computer implemented method for providing a resource expression for access control, the method comprising::

receiving one or more business security profiles that include resource expressions, wherein a resource expression from the resource expressions provides a permission status of a right for resources, the resource expressions include at least one of a set of resources for which the permission status of the right is granted, a set of resources for which the permission status of the right is denied, and a set of resources for which the permission status of the right is undefined;

calculating at least one of a maximum value and a minimum value of the one or more business security profiles, wherein:

the maximum value grants the right for a resource when the right is granted for the resource in at least one business security profile from the one or more business security profiles, and the minimum value grants the right for the resource when the right is granted for the resource in one business security profile from the one or more business security profiles and is not denied in another business security profile from the one or more business security profiles, and the at least one of the maximum value and the minimum value is calculated by using set algebra on the resource expressions, the set algebra includes set operations on at least one of the set of resources for which the permission status of the right is granted, the set of resources for which the permission status of the right is denied, and the set of resources for which the permission status of the right is undefined;

computing a net profile to determine net resources from the set of resources for which the permission status of the right is granted, the set of resources for which the permission status of the right is denied, and the set of resources for which the permission status of the right is undefined, wherein the net profile is computed by aggregating the at least one of the maximum value and the minimum value of the one or more business security profiles; and based on the computed net profile, providing the permission status of the right for the net resources, the permission status is one of granted or denied.

12. The computer implemented method of claim 11, wherein the resource expressions include a resource expression with a quantifier.

13. The computer implemented method of claim 12, wherein the resource expression with the quantifier provides that the right is granted for all resources.

14. The computer implemented method of claim 12, wherein the resource expression with the quantifier provides that the right is granted for all resources except for one or more resources.

15. The computer implemented method of claim 12, wherein the resource expression with the quantifier provides that the right is denied for all resources.

16. The computer implemented method of claim 12, wherein the resource expression with the quantifier provides that the right is denied for all resources except for one or more resources.

17. The computer implemented method of claim 11, wherein the set algebra comprises a set operator selected from a group consisting of union, intersection, and set-theoretic difference.

18. The computer implemented method of claim 11, further comprising:

for the set of resources for which the permission status of the right is undefined, changing the undefined permission status to the one of granted or denied by the computing of the net profile.

19. The computer implemented method of claim 11, wherein the maximum value denies access to the resource when the resource is denied in one business security profile from the one or more business security profiles and is not granted in another business security profile from the one or more business security profiles.

20. The computer implemented method of claim 11, wherein the minimum value denies access to the resource when the resource is denied in at least one business security profile from the one or more business security profiles.

21. A computer system to provide a resource expression for access control, the computer system comprising:

at least one processor; and one or more memory devices communicative with the at least one processor, wherein the one or more memory devices store instructions to:

receive one or more business security profiles that include resource expressions, wherein a resource expression from the resource expressions provides a permission status of a right for resources, the resource expressions include at least one of a set of resources for which the permission status of the right is granted, a set of resources for which the permission status of the right is denied, and a set of resources for which the permission status of the right is undefined;

calculate at least one of a maximum value and a minimum value of the one or more business security profiles, wherein:

the maximum value grants the right for a resource when the right is granted for the resource in at least one business security profile from the one or more business security profiles, and the minimum value grants the right for the resource when the right is granted for the resource in one business security profile from the one or more business security profiles and is not denied in another business security profile from the one or more business security profiles, and the at least one of the maximum value and the minimum value is calculated by using set algebra on the resource expressions, the set algebra includes set operations on at least one of the set of resources for which the permission status of the right is granted, the set of resources for which the permission status of the right is denied, and the set of resources for which the permission status of the right is undefined;

compute a net profile to determine net resources from the set of resources for which the permission status of the right is granted, the set of resources for which the permission status of the right is denied, and the set of resources for which the permission status of the right is undefined, wherein the net profile is computed by aggregating the at least one of the maximum value and the minimum value of the one or more business security profiles; and based on the computed net profile, provide the permission status of the right for the net resources, the permission status is one of granted or denied.

22. The computer system of claim 21, wherein the resource expressions include a resource expression with a quantifier.

23. The computer system of claim 22, wherein the resource expression with the quantifier provides that the right is granted for all resources.

24. The computer system of claim 22, wherein the resource expression with the quantifier provides that the right is granted for all resources except for one or more resources.

25. The computer system of claim 22, wherein the resource expression with the quantifier provides that the right is denied for all resources.

26. The computer system of claim 22, wherein the resource expression with the quantifier provides that the right is denied for all resources except for one or more resources.

27. The computer system of claim 21, wherein the set algebra comprises a set operator selected from a group consisting of union, intersection, and set-theoretic difference.

28. The computer system of claim 21, further comprising:
   for the set of resources for which the permission status of the right is undefined, changing the undefined permission status to the one of granted or denied by the computing of the net profile.

29. The computer system of claim 21, wherein the maximum value denies access to the resource when the resource is denied in one business security profile from the one or more business security profiles and is not granted in another business security profile from the one or more business security profiles.

30. The computer system of claim 21, wherein the minimum value denies access to the resource when the resource is denied in at least one business security profile from the one or more business security profiles.

* * * * *